United States Patent Office 3,494,883
Patented Feb. 10, 1970

3,494,883
POLYOXYMETHYLENE POLYMERS CROSS-LINKED WITH TRIALLYLCYANURATE AND A PEROXIDE
Fred F. Holub and Moyer M. Safford, Schenectady, N.Y., assignors to General Electric Company, a corporation of New York
No Drawing. Filed Nov. 28, 1967, Ser. No. 686,303
Int. Cl. C08g 1/22, 37/04
U.S. Cl. 260—37                                6 Claims

ABSTRACT OF THE DISCLOSURE

A polyoxymethylene polymer or copolymer is mixed with triallylcyanurate and a peroxide and heat-cured to yield a crosslinked modified polyoxymethylene polymer or copolymer which has improved resistance to melt-flow and decomposition by electrical arcs. The compositions of this invention also find use as electrical insulation, circuit breaker liners, etc.

DISCLOSURE

Linear polyoxymethylene polymers (polyformaldehydes) and their copolymers are known in the art. These polymers have limited applicability because of their instability and other undesirable properties. These polyoxymethylenes melt at lower temperatures and frequently depolymerize at elevated temperatures to yield volatile formaldehyde gases which are irritating to persons in the vicinity.

A number of ways for improving the properties of poyloxymethylene polymers and copolymers have been described in the literature, for example, in MacDonald, U. S. Patent 2,768,994. The polymer treated by the method of MacDonald is, however, soluble and fusible and for some purposes a product which is less thermoplastic, and more resistant to solvents is desired.

Polyoxymethylenes have been improved by crosslinking in accordance with U.S. Patent 3,215,671—Melby, which is directed to preparing crosslinked polyoxymethylenes by exposing, to ionizing radiation, a polyoxymethylene having intimately mixed or dispersed therein from 0.5 to 20%, by weight, of selected poly-unsaturated compounds. It is further stated that crosslinking is developed by exposing to ultraviolet light, a mixture of polyoxymethylene and a polyunsaturated compound containing a photo-initiator. It is further stated in a Melby patent that peroxide catalysts are not useful in effecting crosslinking of polyoxymethylenes.

It has been discovered that when polyoxymethylene and copolymers thereof are admixed with triallylcyanurate and then dicumyl peroxide added, and the resultant mixture heat-cured, a crosslinked material results which crosslinking would be entirely unexpected in view of the Melby disclosure.

The polyoxymethylene polymers suitable as starting materials in the process of this invention and which are mixed with triallylcyanurate and dicumyl peroxide are those having polyoxymethylene chains of at least 100 methylene-oxy untis in length. All polyoxymethylenes of this length and over can be employed whether the chains are terminated by ester groups, methyl groups, or other groups. Thus, there may be employed α-polyoxymethylenes, β-polyoxymethylenes, and the higher molecular weight polyoxymethylenes such as eu-polyoxymethylene, as described by J. F. Walker (formaldehyde), second edition, Rheinhold Publishing Corporation, 1953, pp. 1–9. The preparation of the polyoxymethylenes employed in the examples given hereinafter is described in U.S. Patent 3,215,671, which patent is incorporated herein by reference.

The polyoxymethylene copolymers useful in producing the arc resistant compositions of this invention are those copolymers containing polyoxymethylene groups joined by alkylene oxide units and can contain from 0.1 to 15 mole percent of the alkylene oxide units, i.e., they are formaldehydealkylene oxide copolymers. These copolymers are prepared in accordance with the process of U.S. Patent 3,027,352 which is incorporated herein by reference.

The amount of triallylcyanurate employed in the process of this invention is not narrowly critical and can range from 1 to 50 parts, by weight, per 100 parts, by weight, of the polyoxymethylene polymer or copolymer.

The amount of dicumyl peroxide employed in the process of this invention is also not narrowly critical and can range from 0.5 to 10 parts, by weight, of dicumyl peroxide of each 100 parts, by weight, of the polyoxymethylene polymer or copolymer.

In accordance with the process of this invention, the polyoxymethylene polymer or copolymer is placed on a roll mill which is heated to about 165° C.–175° C. and the triallylcyanurate added with milling until an intimate mixture is obtained. The mixture is then cooled to about 130° C.–150° C. and the dicumyl peroxide added slowly while the mixture is milled to give an intimate mixture of the triallylcyanurate, polyoxymethylene polymer or copolymer and the dicumyl peroxide. The mixture is then placed in a mold and heated a 165° C. to 200° C. for about 5 to 90 minutes, whereby the material becomes crosslinked.

As was indicated above, the temperature at which the process of this invention is conducted must be controlled. The milling of the polyoxymethylene polymers or copolymers and the triallylcyanurate can be conducted at temperatures from 150° C. to about 200° C., to insure the intimate mixing of these materials. The temperature at which the dicumyl peroxide is added on the roll mill must be controlled so that there is no premature decomposition of the dicumyl peroxide with resulting crosslinking of the polymer on the roll mill.

One can also employ in producing the compositions of this invention, various fillers such as glass flock, powdered glass, asbestos, and the like. The amount of filled employed in the compositions of this invention is not narrowly critical and can range from 1 part filler per 100 parts polymer to 100 parts filler, by weight, per 100 parts, by weight, of the polyoxymethylene polymer or copolymer.

The following examples serve to further illustrate this invention. All parts are, by weight, unless otherwise expressly set forth.

EXAMPLE 1

150 parts of a polyoxymethylene copolymer, i.e., a copolymer of formaldehyde and ethylene oxide and 50 parts of a polyoxymethylene polymer were added to a two-roll differential speed roll mill and which had been heated at 165° C. and the polymer and copolymer mixed by milling. Triallylcyanurate (40 parts) was then added and the mixture continued to be milled until an intimate dispersion of the triallylcyanurate and the polyoxymethylene polymers were obtained. The mixture was then cooled on the roll mill to about 130° C. to 145° C. and dicumyl peroxide (1 part) was added with milling to give an intimate mixture. The mixture was then preheated and pressed at 165° C. for 15 minutes, yielding a sheet having a tensile strength at 200° C. of 7 pounds per square inch and an elongation of 103%. This crosslinked polymer, when heated to 200° C., was rubbery. A sample of the mixture which did not contain dicumyl peroxide nor triallylcyanurate melted when heated to 200° C. and had no tensile strength at this temperature.

EXAMPLE 2

A polyoxymethylene copolymer (i.e., a copolymer of formaldehyde with ethylene oxide) blend with glass fiber (100 parts) (20%, by weight, glass fiber) was placed on a two-roll differential speed mill which was heated to 170° C. and the mixture milled and triallylcyanurate (20 parts) added with milling to give an intimate dispersion.

The rolls were then cooled to about 140° C. to 150° C. and 0.5 part of dicumyl peroxide added with milling to yield an intimate dispersion of the polyoxymethylene copolymer, triallylcyanurate, glass fibers, and dicumyl peroxide. This material was then heated at 165° C. for 30 minutes under 1000 p.s.i. gauge pressure to yield a crosslinked material having a thickness of 30 mils and a tensile strength of 25 lbs. per square inch and an elongation of 100%, both when measured at 200° C.

A portion of the above mixture of copolymer and glass fibers which contained no triallycyanurate nor dicumyl peroxide was treated in the same manner and when heated to 200° C., it melted and no tensile test could be conducted. This indicates that the material was not crosslinked.

It will, of course, be apparent to those skilled in the art that modifications other than those set forth in the above examples can be employed in the process of this invention without departing from the scope thereof.

What is claimed is:
1. A process for producing crosslinked polyoxymethylene polymers or copolymers which comprises forming, on a weight basis, an admixture composed of (A) 100 parts polyoxymethylene polymer or copolymer; (B) from 1 to 50 parts triallylcyanurate and (C) from 0.5 to 10 parts dicumyl peroxide, and heating said admixture to a temperature of from at least 165° to 200° C. so as to decompose said dicumyl peroxide whereby said polyoxymethylene is crosslinked.

2. A process as in claim 1 wherein from 10 to 100 parts, by weight, of a filler is added.

3. A process as in claim 2 wherein the filler is glass fiber.

4. A heat curable composition which comprises on a weight basis (A) 100 parts of a polyoxymethylene polymer or copolymer, (B) from 1 to 50 parts triallylcyanurate and (C) from 0.5 to 10 parts dicumyl peroxide.

5. The composition as in claim 4 which contains from 1 to 100 parts of a filler.

6. The heat-cured composition of claim 4.

No references cited.

MORRIS LIEBMAN, Primary Examiner
L. T. JACOBS, Assistant Examiner

U.S. Cl. X.R.
260—67